United States Patent

Hasushita et al.

[11] Patent Number: 5,195,814
[45] Date of Patent: Mar. 23, 1993

[54] STROBE UNIT

[75] Inventors: Sachio Hasushita; Takayuki Ito, both of Tokyo, Japan

[73] Assignee: Asahi Kogaku Kogyo Kabushiki Kaisha, Tokyo, Japan

[21] Appl. No.: 833,676

[22] Filed: Feb. 11, 1992

[30] Foreign Application Priority Data

Feb. 15, 1991 [JP] Japan .................................. 3-106963
May 28, 1991 [JP] Japan .................................. 3-223757

[51] Int. Cl.$^5$ ............................................ G03B 15/02
[52] U.S. Cl. ......................................... 362/18; 362/17; 362/223; 362/304; 362/347
[58] Field of Search .................... 362/31, 16, 17, 18, 362/223, 308, 309, 343, 328, 346, 347, 304, 319, 277

[56] References Cited

U.S. PATENT DOCUMENTS 4,293,892 10/1981 Plummer ............................... 362/17
4,298,909 11/1981 Krieg .................................. 362/17 X
5,055,976 10/1991 Arai .................................... 362/17

FOREIGN PATENT DOCUMENTS 1-236504 9/1989 Japan .

OTHER PUBLICATIONS

English Language Abstract of JP 1-236504, Patent Abstracts of Japan, vol. 13, No. 565, Section M-907, p. 125, May 1992.

*Primary Examiner*—Stephen F. Husar
*Attorney, Agent, or Firm*—Greenblum & Bernstein Sandler

[57] ABSTRACT

A strobe unit in which a reflecting mirror is located behind a light source. The strobe unit includes an imaginary semielliptical reflecting mirror having a major axis located on an axis of illumination that passes through the center of the light source. Imaginary quarter-elliptical reflecting mirrors are formed by splitting the imaginary semi-elliptical reflecting mirror along the major axis into two mirror elements which are spaced a predetermined distance from one another in a direction perpendicular to the major axis. The reflecting mirror is defined by modified quarter-elliptical reflecting mirrors which are symmetrical in shape with respect to the axis of illumination and have a continuous smooth reflecting surface that extends between open ends of the imaginary quarter-elliptical reflecting mirrors, and ends which are adjacent to the light source and located between the imaginary semi-elliptical reflecting mirror and quarter-elliptical reflecting mirrors.

16 Claims, 9 Drawing Sheets

STROBE UNIT

BACKGROUND OF THE INVENTION

1. Field of the Invention

The present invention relates to a strobe unit having therein a light source and a reflecting mirror.

2. Description of Related Art

A known strobe unit has a reflecting mirror (shade) that is located behind a light source to reflect light from the light source, so that a composite bundle of rays includes reflected light and direct light from the light source is emitted from the strobe unit towards an object to be taken. The reflecting mirror is usually a semi-elliptical reflecting mirror which has an elliptical cross-sectional shape along a plane that is normal to an axis of a light emitting tube.

The inventors of the present invention have analyzed the orientation properties of a strobe unit having a semi-elliptical reflecting mirror and have found that the quantity of light at the center portion is smaller than that at the upper and lower portions thereof. On irregularity in the distribution of light, as a result of the orientation properties, has an adverse influence on the picture of an object and decreases the guide number of the strobe which is based on the quantity of light at the center portion.

There are two types of known strobe units. A first type has a Fresnel lens (condenser lens) positioned in front of a reflecting mirror and a second type has no Fresnel lens. The second type, having no Fresnel lens, has a high light utilization efficiency, since there is no vignetting by the Fresnel lens (light loss caused by the wedge portion of the Fresnel lens). Nevertheless, the orientation properties of the second type of strobe unit still exhibit an irregularity in the distribution of light. On the Other hand, it is difficult to miniaturize the first type of strobe unit because of the presence of the Fresnel lens.

The second type strobe unit, having no Fresnel lens, is usually incorporated in a camera having a lens of fixed focal length, while the first type strobe unit, having the Fresnel lens, is usually used as a zoom strobe device for a zoom lens camera. In the zoom strobe device, the movement of the light source and the reflecting mirror relative to the condenser lens in the optical axis direction causes the illumination angle to change. It has been found that the condenser lens in the strobe device decreases the illumination angle of direct light from the light source on the telephoto side, but there is little change in the illumination angle of light (indirect light) reflected by the reflecting mirror. Therefore, if optimum orientation properties are determined on the wide-angle side, there is a large quantity of light radiating beyond the angle of view on the telephoto side, resulting in a decreased guide number. This results in a phenomenon wherein, from the viewpoint of the orientation properties, the quantity of light at the center portion is less than that in the circumferential portion and the quantity of light emitted beyond the angle of view is increased.

SUMMARY OF THE INVENTION

A primary object of the present invention is to provide a strobe unit that includes a light source and a reflecting mirror having improved orientation properties which can not be expected in a conventional elliptical reflecting mirror.

Another object of the present invention is to improve the orientation properties on the telephoto side and increase the guide number without deteriorating the orientation properties on the wide angle side to which no small importance is attached.

The principal concept of the present invention resides in the modification of an existing elliptical reflecting mirror to obtain better orientation properties.

To achieve the object mentioned above, according to the present invention, there is provided a strobe unit having a light source and a reflecting mirror located behind the light source, wherein the improvement comprises an imaginary semi-elliptical reflecting mirror having a major axis that is located on an axis of illumination passing through the center of the light source, and imaginary quarter-elliptical reflecting mirrors which are formed by splitting the imaginary semi-elliptical reflecting mirror along the major axis into two mirror elements which are spaced at a predetermined distance from one another in a direction that is perpendicular to the major axis. The reflecting mirror is defined by modified quarter-elliptical reflecting mirrors which are symmetrical in shape with respect to the axis of illumination and have a continuous smooth reflecting surface extending between open ends of the imaginary quarter-elliptical reflecting mirrors and ends which are adjacent to the light source and which are located between the imaginary semi-elliptical reflecting mirror and quarter-elliptical reflecting mirrors.

Preferably, the modified quarter-elliptical reflecting mirrors have quarter-elliptical reflecting surfaces that is modified with an aspheric coefficient, so that light emitted from the light source is reflected by the modified quarter-elliptical reflecting surfaces in a direction more outward than light reflected by the imaginary quarter-elliptical reflecting mirrors.

In other words, light emitted from the light source perpendicular to the axis of illumination is reflected by the modified quarter-elliptical reflecting mirrors in a direction substantially parallel with the axis of illumination.

With this arrangement, the orientation properties of the strobe unit can be improved.

The light source can be in the form of an elongated bar or a point source. In the case of an elongated bar-like light source, the reflecting mirror has a uniform cross-sectional shape in planes that are perpendicular to the axis of the elongated bar-like light source. In the case of a point light source, the reflecting mirror has an elliptic paraboloid shape which is formed by a rotation about the axis of illumination.

According to another aspect of the present invention, there is provided a strobe unit having a light source, a reflecting mirror located behind the light source, and a condenser lens located at the open end of the reflecting mirror. The improvement comprises imaginary quarter-elliptical reflecting mirrors which are formed by splitting an imaginary semi-elliptical reflecting mirror having a major axis located on an axis of illumination passing through the center of the light source into two mirror elements which are spaced at a predetermined distance from one another in a direction that is perpendicular to the major axis along the major axis. The reflecting mirror is defined by tilted quarter-elliptical reflecting mirrors which are symmetrical in shape with respect to the axis of illumination and which have a tilted reflecting surface that is obtained by rotating (or tilting) the imaginary quarter-elliptical reflecting mirrors about the ends located at the minor axis thereof.

In particular, the tilted imaginary quarter-elliptical reflecting mirrors improve the orientation properties of a strobe unit having a condenser lens.

Similar to a strobe unit having no condenser lens, in a strobe unit including the condenser lens, the light source can be in the form of an elongated bar or a point source. In the case of an elongated bar-like light source, the reflecting mirror has a uniform cross sectional shape in planes perpendicular to the axis of the elongated bar-like light source. In the case of a point light source, the reflecting mirror has an elliptic paraboloid shape which is formed by a rotation about the axis of illumination.

If the quarter-elliptical tilted reflecting mirrors are constituted by modified quarter-elliptical reflecting mirrors, the light emitted from the light source is reflected by the modified quarter-elliptical tilted reflecting surfaces in a more outward direction than the light reflected by the imaginary quarter-elliptical reflecting mirrors.

The strobe unit of the present invention can be advantageously applied particularly to a zoom strobe device in which the light source and the quarter-elliptical tilted reflecting mirrors or the modified quarter-elliptical tilted reflecting mirrors are movable together with respect to the condenser lens in the direction of the axis of illumination.

The strobe unit of the present invention can also be applied to a strobe device having an illumination angle that corresponds to a wide angle of a zoom strobe device.

The present disclosure relates to subject matter contained in Japanese patent applications No. HEI 3-106963 (filed on Feb. 15, 1991) and No. HEI 3-223757 (filed on May 28, 1991) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
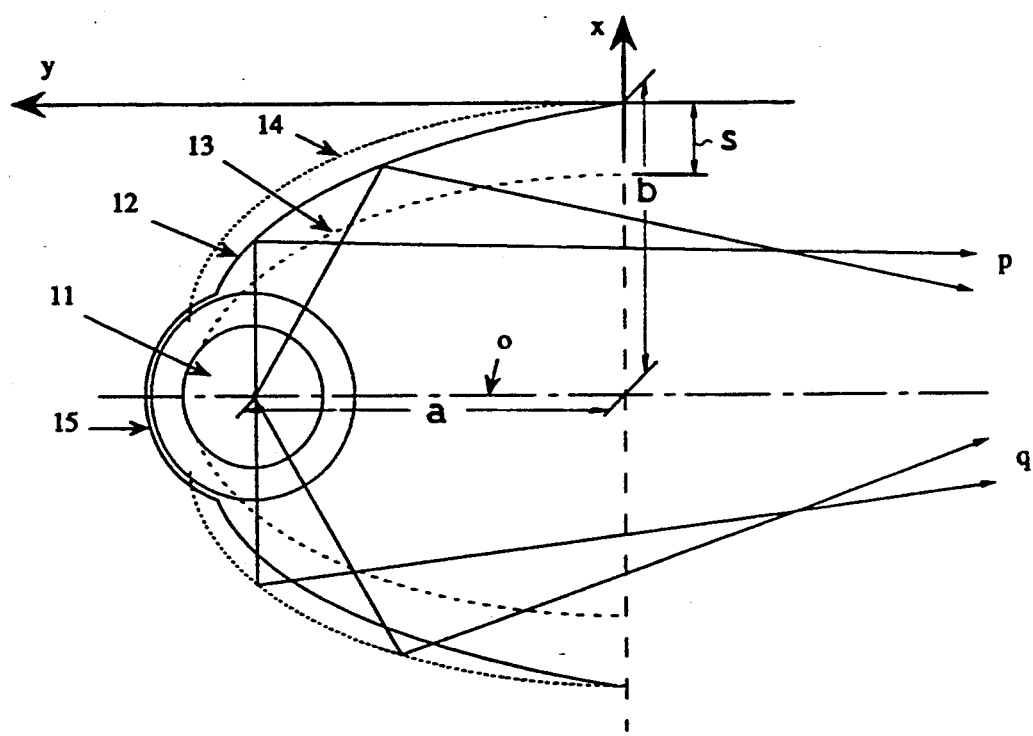
FIG. 1 is a sectional view of a strobe unit according to a first embodiment of the present invention, in comparison with a conventional example.
Figure 2:
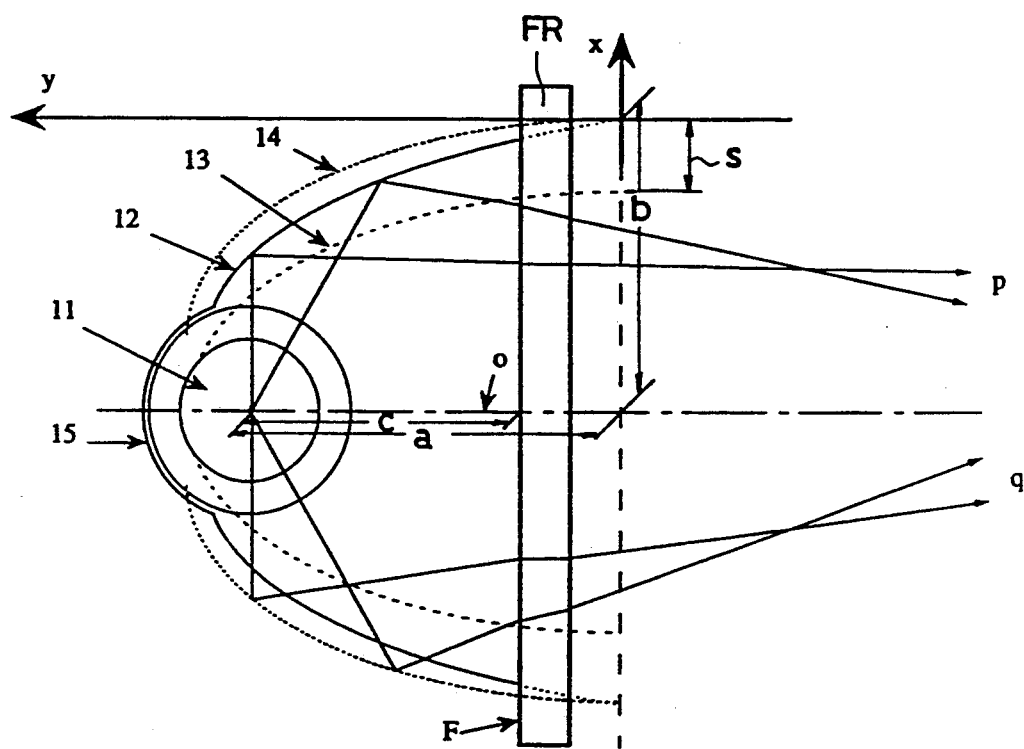
FIG. 2 is a sectional view of a strobe unit according to a second embodiment of the present invention, in comparison with a conventional example.
Figure 3:
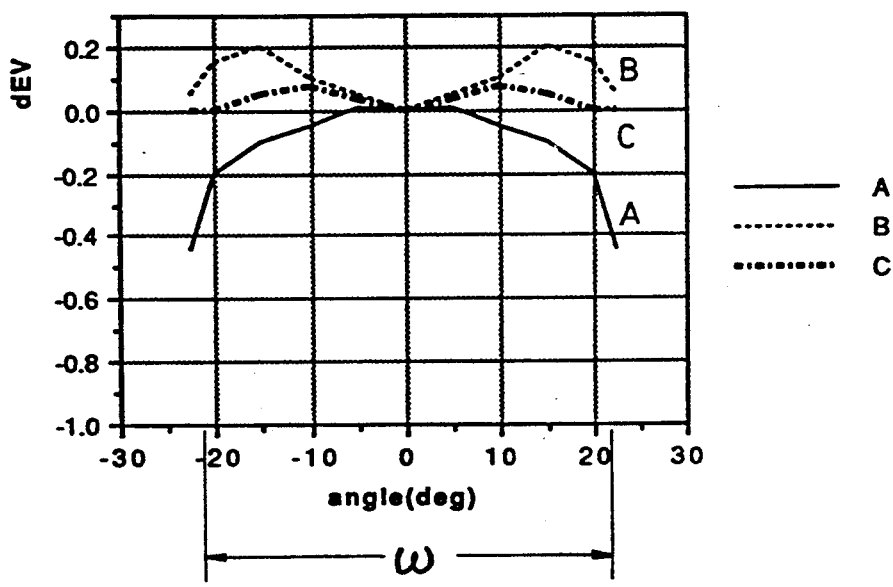
FIG. 3 is a graph showing orientation properties of a strobe unit according to the present invention and a comparative example.

FIGS. 1 through 3 show a first embodiment of the present invention applied to a strobe unit having an elongated light source (light emitting tube), in comparison with conventional examples.

FIG. 1 shows a strobe unit having no Fresnel lens and FIG. 2 shows a strobe unit having a Fresnel lens FR at the opening of the reflecting mirror.

A light emitting tube (e.g. xenon tube) 11 is sectioned along a plane that is normal to the axis thereof. A modified reflecting mirror 12, an imaginary reflecting mirror 13 and an imaginary reflecting mirror 14 are divided into substantially quarter-elliptical sections which are symmetrical about an illumination optical axis (plane) O of the light emitting tube 11. Each of the sections of the modified reflecting mirror 12, the imaginary reflecting mirror 13, and the imaginary reflecting mirror 14 have shapes which are uniform in the direction perpendicular to the sheet of the drawing. The halves of the mirror 12 are connected by a circular arc to form an apex portion. The light emitting tube 11 is received in a recess 15 formed in the apex portion of the modified reflecting mirror 12. The quarter-elliptical sections of the imaginary mirror 13 together form a semi-ellipse having a major axis that is coincidental with the optical axis O. The center of the light emitting tube 11 is located at the focal point of the imaginary semi-elliptical reflecting mirror 13. The quarter-elliptical sections of the imaginary reflecting mirror 14 are defined by the two halves of the imaginary semi-elliptical reflecting mirror 13 which is split by the optical axis O. The halves are then perpendicularly spaced from the optical axis O at a distance "s". The distance "s" is approximately equal to half the diameter of the light emitting tube 11.

The opening ends of the modified reflecting mirror 12 are substantially coincidental with the opening ends of the quarter-elliptical sections of the imaginary reflecting mirror 14. The points at which the inner ends of the modified reflecting mirror 12 are connected to the circular arc portion lie between the imaginary reflecting mirrors 13 and 14. The halves of the modified reflecting mirror 12 smoothly and continuously extend between their opening and inner ends. The opening ends of the imaginary reflecting mirror 14 are located on the minor axis of the ellipse from which they were originally formed (i.e. the ellipse of the imaginary reflecting mirror 13). Note that the shapes of the modified reflecting mirror 12, the imaginary semi-elliptical reflecting mirror 13 and the imaginary quarter-elliptical sections of the reflecting mirror 14 are exaggerated in the drawings.

The modified reflecting mirror 12 is basically formed by modifying the quarter-elliptical sections of the imaginary reflecting mirror 14 by an aspheric coefficient of more than cubic order, so that the orientation properties thereof are such that the quantity of light is largest at the center portion thereof. The difference in quantity of light between the center portion and the vicinity thereof is as small as possible. and the least quantity of light radiates beyond angle ω of view, as shown by solid line A in FIG. 3. In other words, as a result of the modification, light "p" emitted from the light emitting tube 11 and reflected by the modified reflecting mirror 12 is directed more outwardly than light "q" emitted from the light emitting tube 11 and reflected by the imaginary reflecting mirror 14. Since the modification is effected on the whole surface of the imaginary reflecting mirror 14 to create the modified reflecting mirrors 12, improved orientation properties, as shown by the solid line "A" in FIG. 3 can be obtained.

Namely, the imaginary reflecting mirror 14 reflects light emitted from the center of the light emitting tube 11 perpendicular to the optical axis O in the direction substantially parallel with the optical axis O.

In FIG. 3, the change in the quantity of light is represented by an Ev value, which is zero at the center where the largest quantity of light is produced. The orientation properties include light reflected by the modified reflecting mirror 12 and direct light from the light emitting tube 11. For the sake of comparison, the orientation properties of the imaginary reflecting mirror 13 and the imaginary reflecting mirror 14 are designated by a dotted line B and a dotted and dashed line C in FIG. 3, respectively.

Examples of the modified reflecting mirror 12 are described below.

A. The type of strobe unit having no Fresnel lens, as shown in FIG. 1;

In the x-y coordinates shown in FIG. 1, the following equation is satisfied:

$$x = \{Cy^2/[1+\{1-(1+K)C^2y^2\}^{\frac{1}{2}}]\} + A_4 y^4$$

wherein $C = -0.0439$; $K = 3.612$; $A_4 = -3.756 \times 10^{-6}$;
the distance "a" from the center of the light emitting tube 11 to the x-axis = 9.6 mm;
the distance "b" from the center of the light emitting tube 11 to the y-axis = 5.0 mm B. The type of strobe unit having the Fresnel lens as shown in FIG. 2;

In the x-y coordinates shown in FIG. 2, the following equation is satisfied:

$$x = \{Cy^2/1+\{1-(1+K)C^2y^2\}^{\frac{1}{2}}]\} + A_4 y^4$$

wherein $C = -0.0439$; $K = 4.10$; $A_4 = -3.756 \times 10^{-6}$;
the distance "a" from the center of the light emitting tube 11 to the x-axis = 9.4 mm;
the distance "b" from the center of the light emitting tube 11 to the y-axis = 5.0 mm
The data of the Fresnel lens FR is as follows:
focal length fFR = 61 mm; the thickness "d" of the center portion = 1 mm; the Fresnel surface F is formed on the surface of the Fresnel lens adjacent to the light emitting tube; distance "c" from the center of the light emitting tube 11 to the Fresnel surface F = 7.9 mm The strobe unit according to the embodiment illustrated in FIG. 2 is smaller than that according to the embodiment illustrated in FIG. 1. Namely, the length of the strobe unit illustrated in FIG. 2 can be shortened in the optical axis direction in comparison with the strobe unit shown in FIG. 1.

As can be seen from the above discussion, according to the present invention, the orientation properties can be improved, so that the largest quantity of light is obtained at the center portion, the difference in quantity of light between the center portion and the vicinity thereof is reduced, and the amount of light which radiates out of the angle of view is minimized. Consequently, the utilization efficiency of light can be increased. Accordingly, a larger guide number, which is determined based on the quantity of light at the center portion, can be selected for the same light source.

Figure 4:
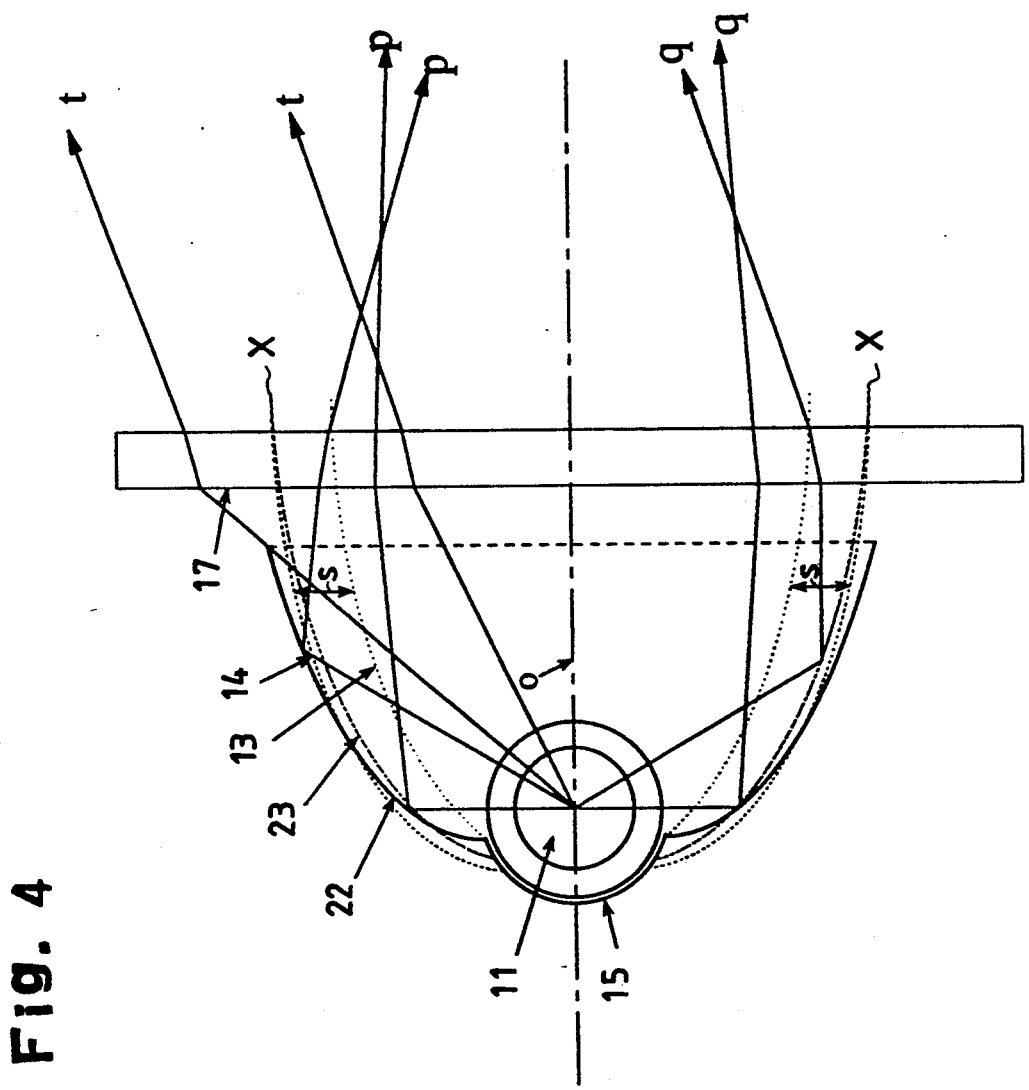
FIG. 4 is a sectional view of a strobe unit applied to a zoom strobe device according to the present invention, in comparison with a conventional example on a wide angle side.
Figure 5:
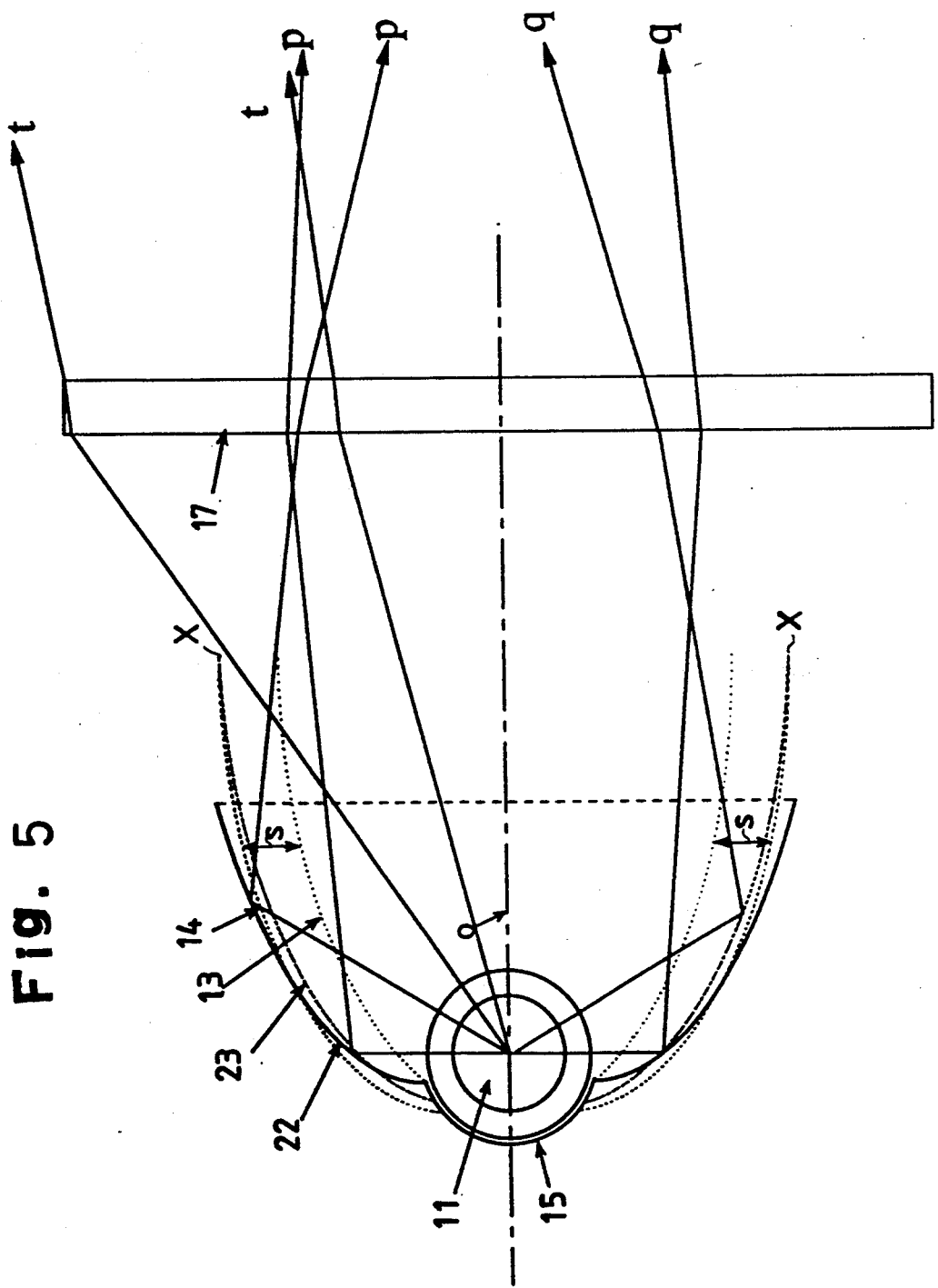
FIG. 5 is a sectional view similar to FIG. 4, in which the condenser lens is shown on the telephoto side.

FIGS. 4 and 5 show another embodiment of the present invention applied to a zoom strobe device having a condenser lens (Fresnel lens), shown in a wide angle position and a telephoto angle position, respectively.

The light emitting tube (e.g. xenon tube) 11 is sectioned along axis O thereof. Each of the sections of modified tilted reflecting mirror 22, imaginary tilted reflecting mirror 23, imaginary reflecting mirror 13 and imaginary reflecting mirror 14 have shapes which are uniform in a direction perpendicular to the sheet of the drawing or which are rotationally symmetrical (elliptic paraboloid) about the optical axis O.

The optical axis O of illumination (plane) O is coincident with the major axis of the imaginary semi-elliptical reflecting mirror 13. The light emitting tube 11 is received in a recess 15 formed in an apex portion which connects a pair of modified quarter-elliptical sections which are angled outwardly to define a tilted reflecting mirror 22 that is symmetric about the optical axis O. The center of the light emitting tube 11 is located at one of the focal points of the imaginary semi-elliptical reflecting mirror 13. The imaginary reflecting mirror 14 is formed by two halves of the imaginary semi-elliptical reflecting mirror 13, which is split by the optical axis O. The halves are then perpendicularly spaced from the optical axis O by a distance "s". The distance "s" is approximately equal to the inner diameter of the light emitting tube 11.

The light source 11, the imaginary reflecting mirror 13, the imaginary reflecting mirror 14, and the recess 15 are the same as those in FIGS. 1 and 2.

A Fresnel lens 17 is located in front of the modified tilted reflecting mirror 22. The light source 11 and the modified tilted reflecting mirror 22 are integral with each other and are together movable relative to the Fresnel lens 17 in the optical axis direction 0 to realize a zoom strobe device. The assembly of the light source 11 and the modified tilted reflecting mirror 22 in the wide angle position (wide illumination angle) in FIG. 4 is moved far from the Fresnel lens 17 into the telephoto position (narrow illumination angle).

In the illustrated embodiment, the tilted reflecting mirror 23 is formed by rotating or tilting the imaginary quarter-elliptical sections of reflecting mirror 14 inwardly about the outer ends located at the minor axis X thereof, so that the inner ends of the imaginary reflecting mirror 14 adjacent to the light source 11 move toward the light source 11. The tilt angle is preferably within ±3°, taking into consideration the orientation properties to be obtained.

Although the modified tilted reflecting mirror 22 is used as an actual reflecting mirror in the illustrated embodiment, part of the tilted reflecting mirror 23 can be used as a reflecting mirror to obtain better orientation properties than those of the prior art. The shapes of the modified tilted reflecting mirror 22, the tilted reflecting mirror 23, the imaginary reflecting mirror 13, the imaginary reflecting mirror 14, and the tilt angle of the tilted reflecting mirror 23 are exaggerated in the drawings.

Figure 6:
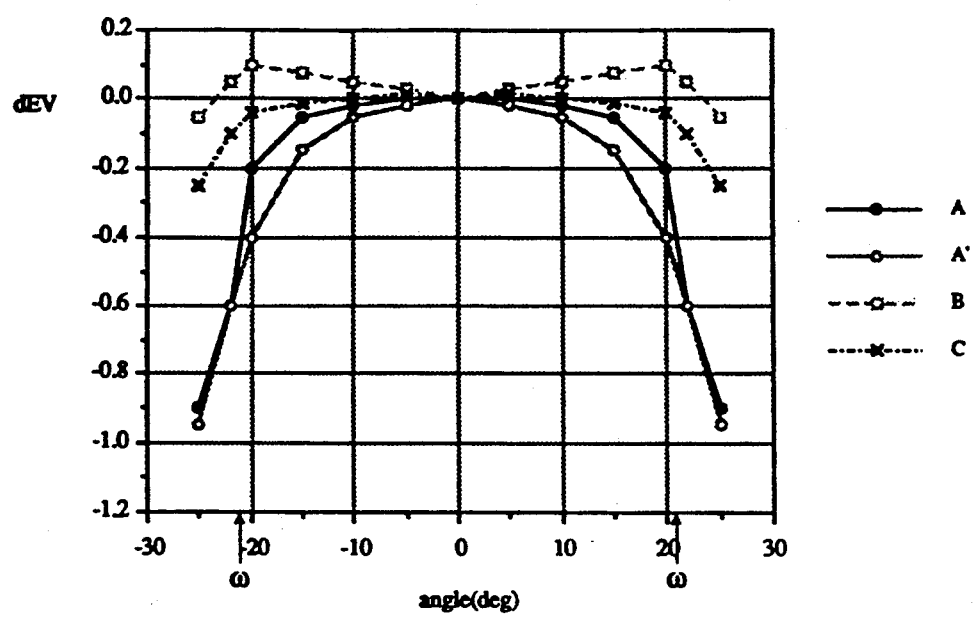
FIG. 6 is a graph showing orientation properties of the strobe unit shown in FIG. 4 and a comparative example.
Figure 7:
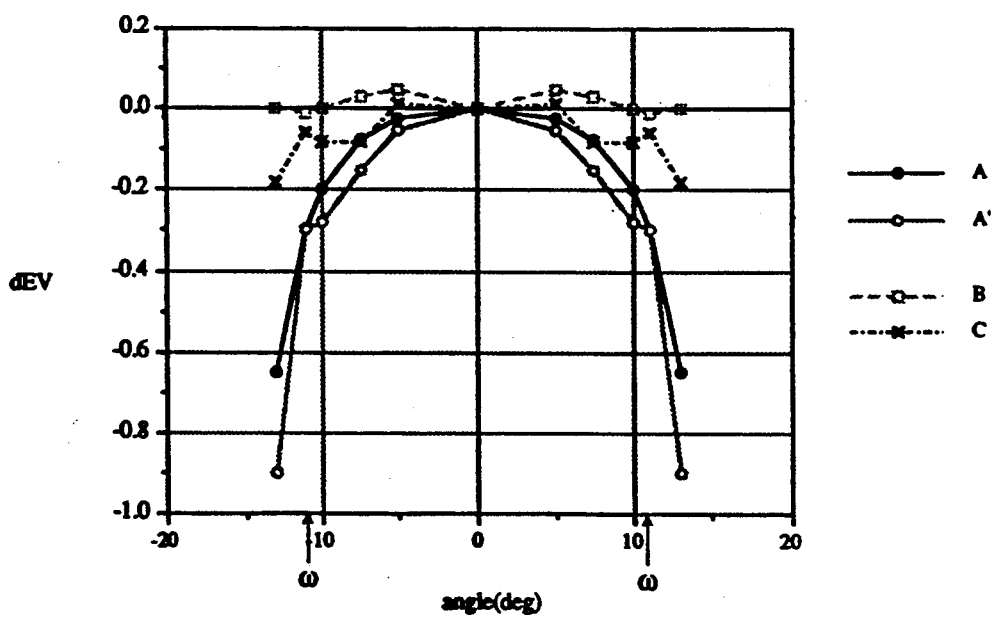
FIG. 7 is a graph showing orientation properties of the strobe unit shown in FIG. 5 and a comparative example.
Figure 8:
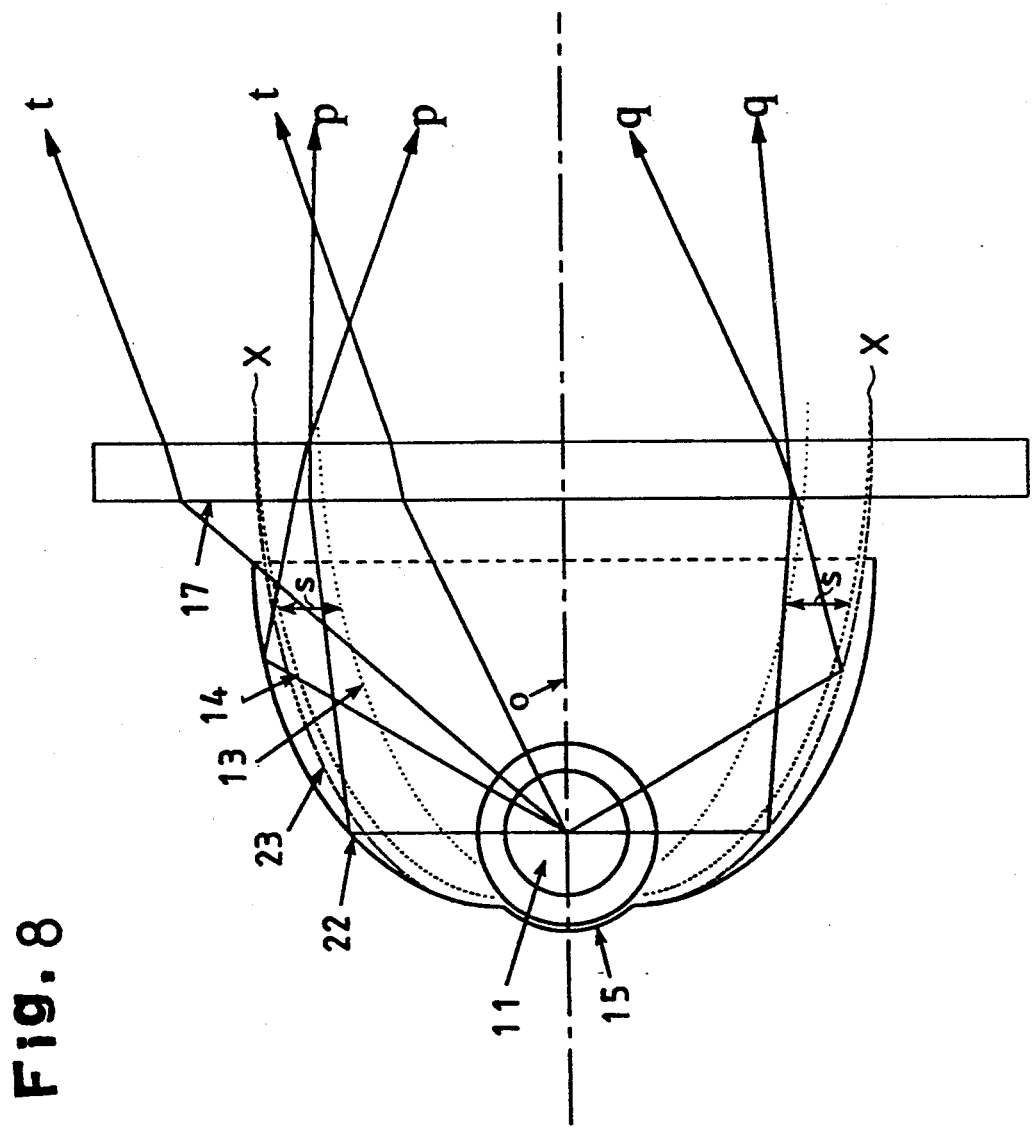
FIG. 8 is a sectional view of a strobe unit applied to a zoom strobe device according to another embodiment of the present invention, in comparison with a conventional example on a wide angle side.
Figure 9:
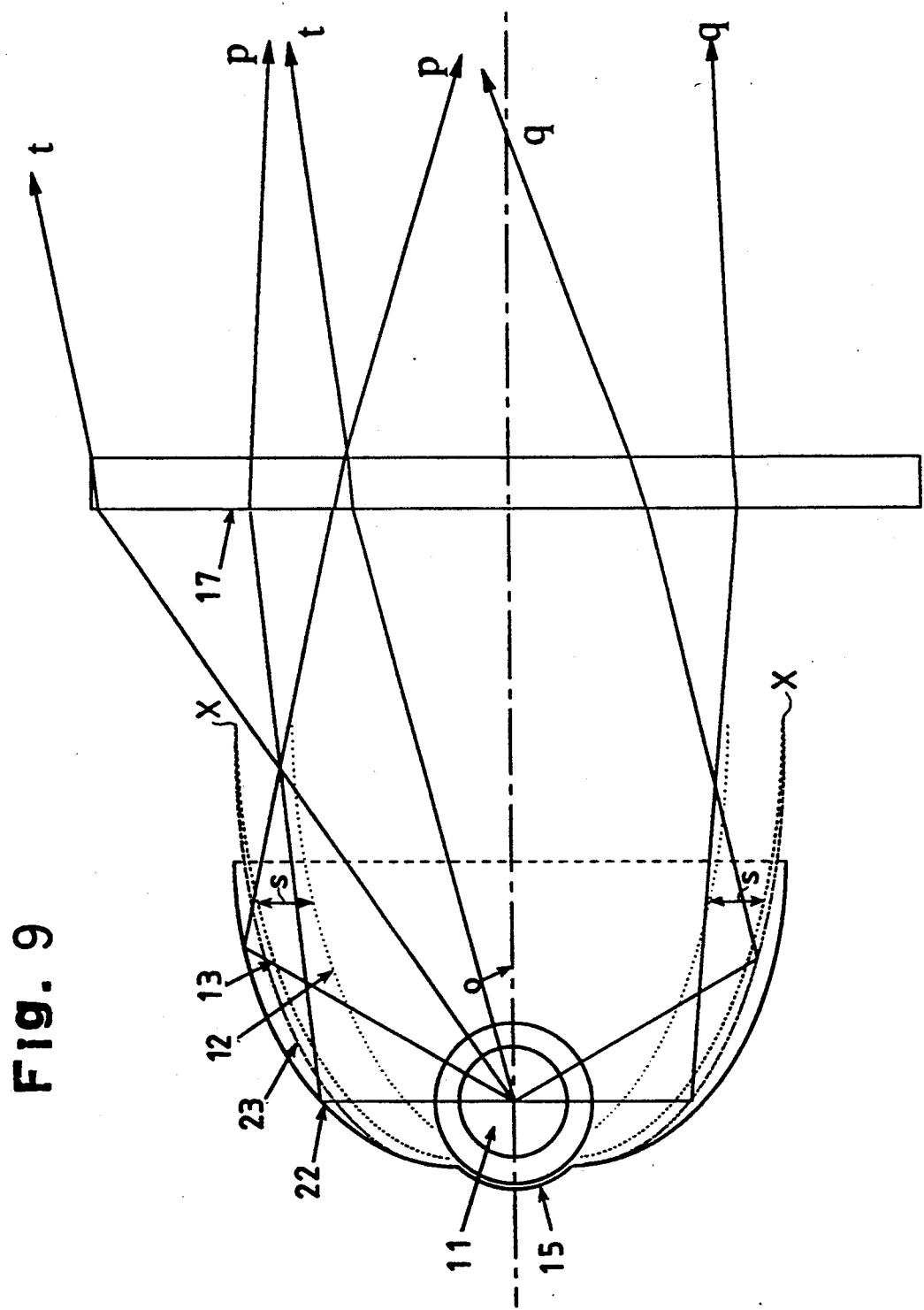
FIG. 9 is a sectional view similar to FIG. 8, in which the condenser lens is shown on the telephoto side.
Figure 10:
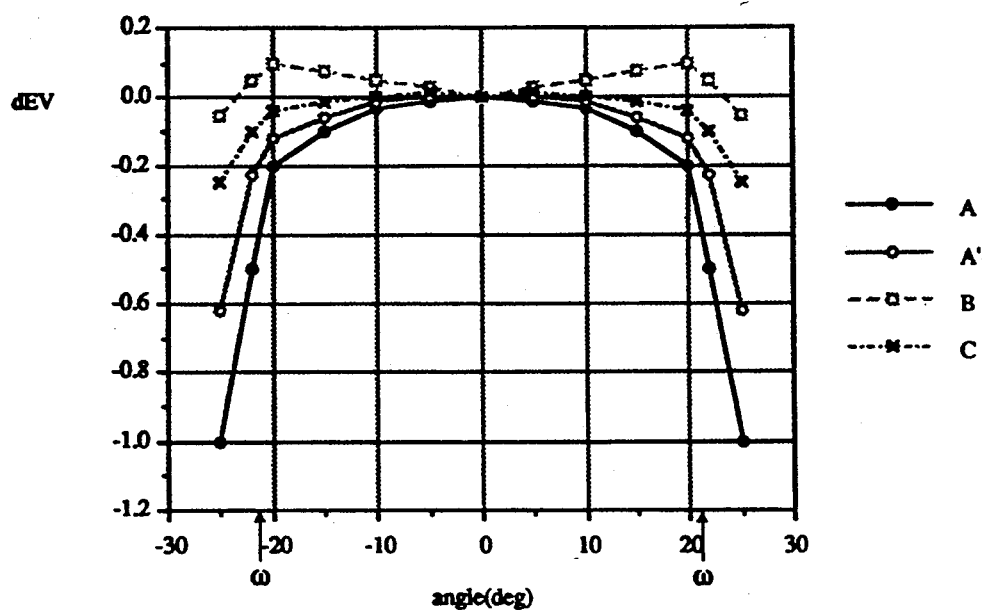
FIG. 10 is a graph showing the orientation properties of the strobe unit shown in FIG. 8 and a comparative example; and, FIG. 11 is a graph showing orientation properties of the strobe unit shown in FIG. 9 and a comparative example.
Figure 11:
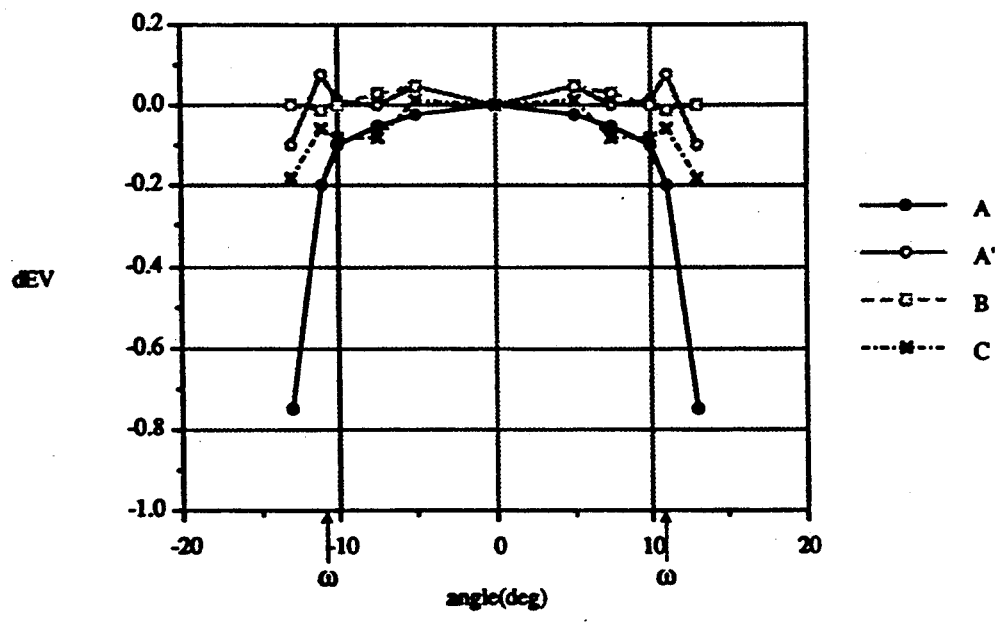

The modified tilted reflecting mirror 22 is formed by modifying the tilted reflecting mirror 23 by an aspheric coefficient, so that the orientation properties thereof are such that the quantity of light is largest at the center portion thereof, the difference in quantity of light between the center portion and the vicinity thereof being as small as possible, and the least quantity of light radiates beyond the wide angle ω of view, as shown by the solid line A in FIGS. 6 and 7. In other words, as a result of the modification, light "p" emitted from the light emitting tube 11 in the same direction and reflected by the modified tilted reflecting mirror 22 is oriented more outwardly than light "q" emitted from the light emitting tube 11 and reflected by the tilted reflecting mirror 23. Since the modification is effected on the whole surface of the tilted reflecting mirror 23 to create the modified tilted reflecting mirror 22, improved orientation properties; as shown by solid line "A" in FIGS. 6 and 7 can be obtained. For the sake of comparison, the orientation properties of the tilted reflecting mirror 23 are designated by dotted line A' in FIGS. 6 and 7.

Similar to FIG. 3, in FIGS. 6 and 7, the change in the quantity of light is represented by the Ev value, which is zero at the center where the largest quantity of light is produced. The orientation properties include light reflected by the modified tilted reflecting mirror 22 and direct light "t" from the light emitting tube 11.

In FIGS. 6 and 7, "ω" designates the target orientation angles on the wide angle side and the telephoto side. For the sake of comparison, the orientation properties of the imaginary reflecting mirror 13 and the imaginary reflecting mirror 14 are designated by a dotted line B and a dotted and dashed line C in FIGS. 6 and 7, respectively. It can be understood that in the orientation properties B, not only is there a large quantity of light gathered in the circumferential portion rather than the center portion within the target orientation angle range, resulting in a large light loss (energy loss), and consequently a decreased guide number, but there is also a possibility that an annular bright band will appear depending on the strobe distance. In the orientation properties C, which exhibit a substantially flat orientation, there is a large quantity of light outside the target orientation angle range, leading to a light loss (energy loss). As a result, it is difficult to decrease the guide number.

FIGS. 8 through 11 show another embodiment of the present invention. FIGS. 8, 9, 10 and 11 correspond to FIGS. 4, 5, 6 and 7, respectively. The differences between the embodiment shown in FIGS. 4 through 7 and the embodiment shown in FIGS. 8 through 11 are that the tilt direction of the tilted reflecting mirror 23 in FIGS. 8 through 11 is opposite to that of the tilted reflecting mirror 23 in FIGS. 4 through 7, with respect to the elliptical reflecting mirror 14, and the profile of the modified tilted reflecting mirror 22 intersects the profile of the tilted reflecting mirror 23 only in FIGS. 4 through 7.

Namely, unlike the arrangement illustrated in FIGS. 4 through 7, in which the profile of the modified tilted reflecting mirror 22 intersects the profile of the tilted reflecting mirror 23, the profile of the modified tilted reflecting mirror 22 in the arrangement illustrated in FIGS. 8 through 11 partially overlaps but does not intersect the profile of the tilted reflecting mirror 23 at the ends near the optical axis. Although there is a difference in the shape (profile) of the modified tilted reflecting mirror 22 in the arrangements shown in FIGS. 4 through 7 and those shown in FIGS. 8 through 11, in both cases, light "p" emitted from the light emitting tube 11 in the same direction and reflected by the modified tilted reflecting mirror 22 is oriented more outwardly than the light "q" emitted from the light emitting tube 11 and reflected by the tilted reflecting mirror 23. In FIGS. 8 through 11, the elements corresponding to those in FIGS. 4 through 7 are designated with the same reference numerals.

As can be seen from the above discussion, according to the present invention, the orientation properties of the strobe unit are improved, so that the largest quantity of light is obtained at the center portion, the difference in quantity of light between the center portion and the vicinity thereof being made as small as possible, and the least quantity of light radiating beyond the angle of view. Consequently, the utilization efficiency of light can be increased. Accordingly, a larger guide number, which is defined by the quantity of light at the center portion, can be selected for the same light source.

We claim:

1. A strobe unit having a light source and a reflecting mirror that is located behind said light source, the improvement comprising an imaginary semi-elliptical reflecting mirror having a major axis that is located on an axis of an illumination passing through a center of said light source and imaginary reflecting mirrors which are quarter-elliptical in shape and are formed by splitting said imaginary semi-elliptical reflecting mirror along a major axis into two mirror elements which are spaced a predetermined distance from one another in a direction that is perpendicular to said major axis, said reflecting mirror being defined by modified reflecting mirrors which are symmetrical in shape with respect to said axis of illumination and which have continuous smooth reflecting surfaces extending between open ends of said imaginary quarter-elliptical reflecting mirrors and ends which are adjacent to said light source and which are located between said imaginary semi-elliptical reflecting mirror and said quarter-elliptical reflecting mirrors.

2. The strobe unit of claim 1, wherein said modified reflecting mirror has quarter-elliptical reflecting surfaces that are modified with an aspheric coefficient, so that light emitted from said light source is reflected by said modified reflecting surfaces more outwardly than light reflected by said imaginary quarter-elliptical reflecting mirrors.

3. The strobe unit of claim 1, wherein said modified reflecting mirror is shaped so that light emitted form said light source in a direction normal to said axis of illumination is reflected by said modified reflecting mirror in a direction that is substantially parallel with said axis of illumination.

4. The strobe unit of claim 1, wherein said light source is in a form of an elongated bar.

5. The strobe unit of claim 1, wherein said reflecting mirror is uniform in a cross-sectional shape in planes that are perpendicular to an axis of said elongated bar-like light source.

6. The strobe unit of claim 1, wherein said light source comprises a point light source.

7. The strobe unit of claim 6, wherein said reflecting mirror has an elliptic paraboloid shape that is defined in a shape by a rotation about said axis of illumination.

8. The strobe unit of claim 1, wherein said reflecting mirror has an open end without a condenser lens.

9. A strobe unit having a light source, a reflecting mirror that is located behind said light source, and a condenser lens that is located at an open end of said reflecting mirror, the improvement comprising imaginary quarter-elliptical reflecting mirrors that are formed by splitting an imaginary elliptical reflecting mirror having a major axis located on an axis of illumination passing through a center of said light source into two mirror elements that are spaced a predetermined distance from one another in a direction perpendicular to said major axis along said major axis, said reflecting mirror being defined by tilted quarter-elliptical reflecting mirrors that are symmetrical in shape with respect to said axis of illumination and which have a tilted reflecting surface that is obtained by tilting said imaginary quarter-elliptical reflecting mirrors about outer ends located at a minor axis thereof.

10. The strobe unit of claim 1, wherein said tilted quarter-elliptical reflecting mirrors have modified quarter-elliptical tilted reflecting surfaces, so that light emitted from said light source is reflected by said modified quarter-elliptical tilted reflecting surfaces more outwardly than light reflected by said imaginary quarter-elliptical reflecting mirrors.

11. The strobe unit of claim 9, wherein said light source and said quarter-elliptical tilted reflecting mirrors are together movable with respect to said condenser lens in a direction of said axis of illumination.

12. The strobe unit of claim 10, wherein said light source and said modified quarter-elliptical tilted reflecting mirrors are together movable with respect to said condenser lens in a direction of said axis of illumination.

13. The strobe unit of claim 9, wherein said light source is in a form of an elongated bar light source.

14. The strobe unit of claim 13, wherein said reflecting mirror and said condenser lens are uniform in cross-sectional shape in planes that are perpendicular to an axis of said elongated bar light source.

15. The strobe unit of claim 9, wherein said light source comprises a point light source.

16. The strobe unit of claim 15, wherein said reflecting mirror and said condenser lens have elliptic paraboloid shapes that are formed by a rotation about said axis of illumination.

* * * * *